No. 648,583. Patented May 1, 1900.
A. R. BLACK.
REVOLVING SULKY HAY RAKE.
(Application filed Jan. 19, 1900.)
(No Model.) 3 Sheets—Sheet 1.
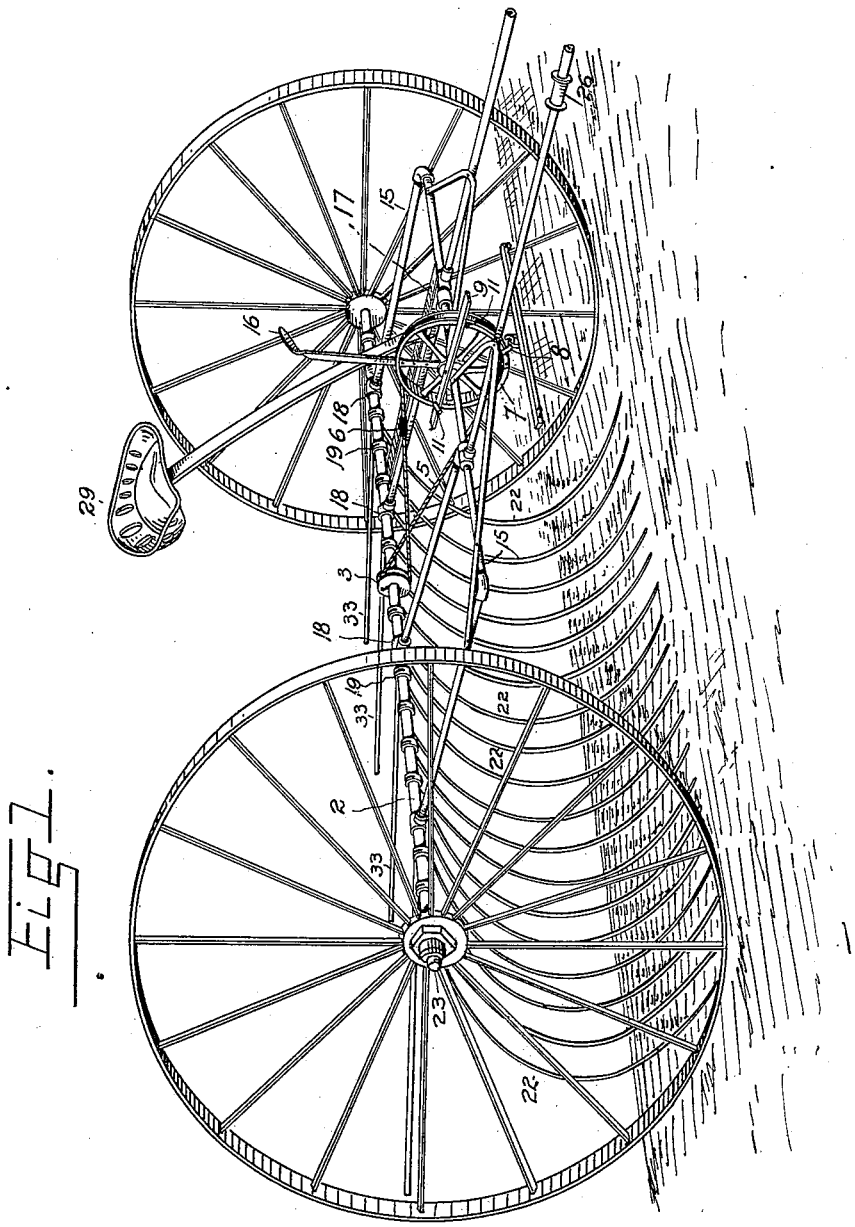
WITNESSES: INVENTOR.

No. 648,583. Patented May 1, 1900.
A. R. BLACK.
REVOLVING SULKY HAY RAKE.
(Application filed Jan. 19, 1900.)
(No Model.) 3 Sheets—Sheet 2.
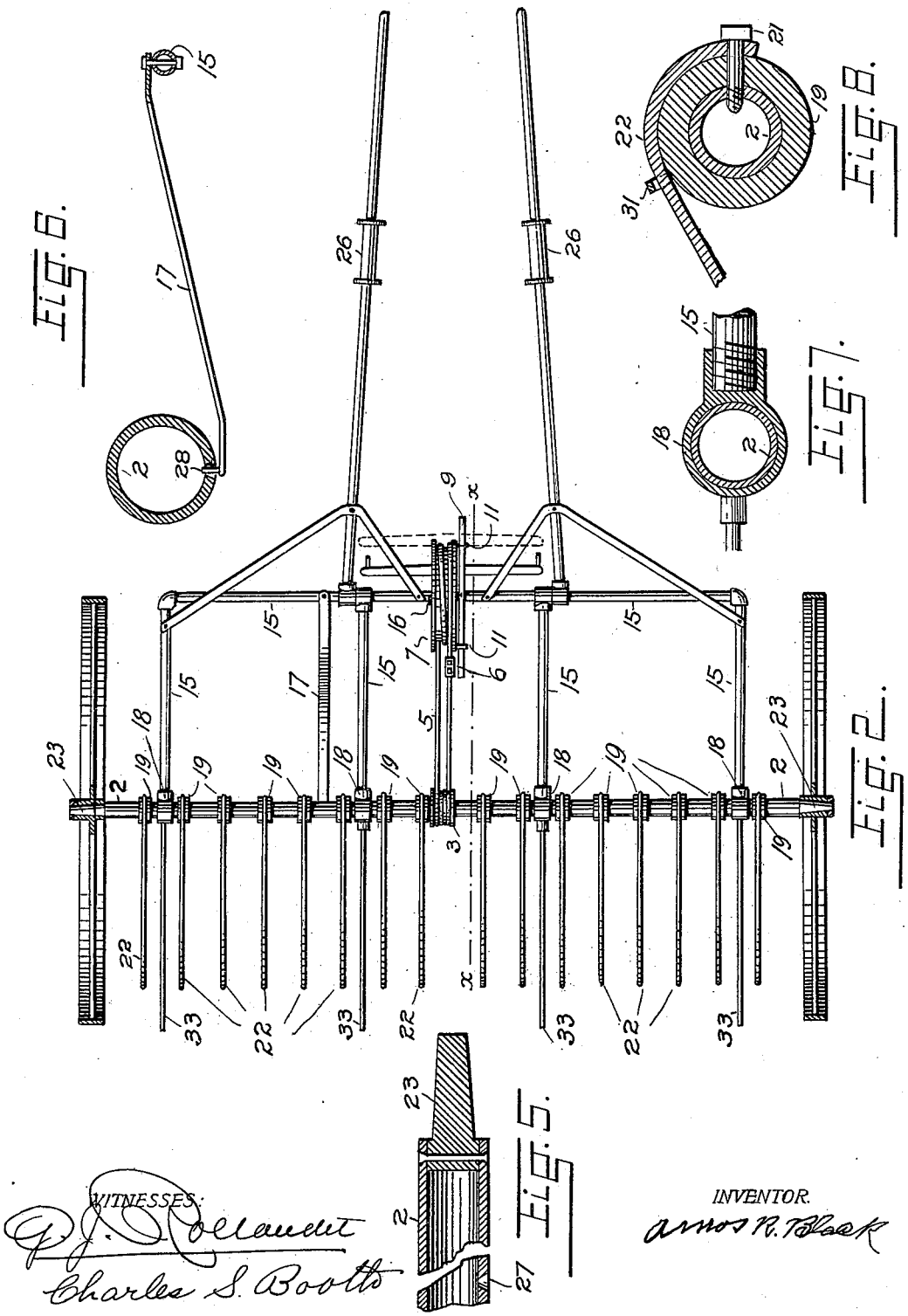
INVENTOR.
Amos R. Black No. 648,583. Patented May 1, 1900.
A. R. BLACK.
REVOLVING SULKY HAY RAKE.
(Application filed Jan. 19, 1900.)
(No Model.) 3 Sheets—Sheet 3.
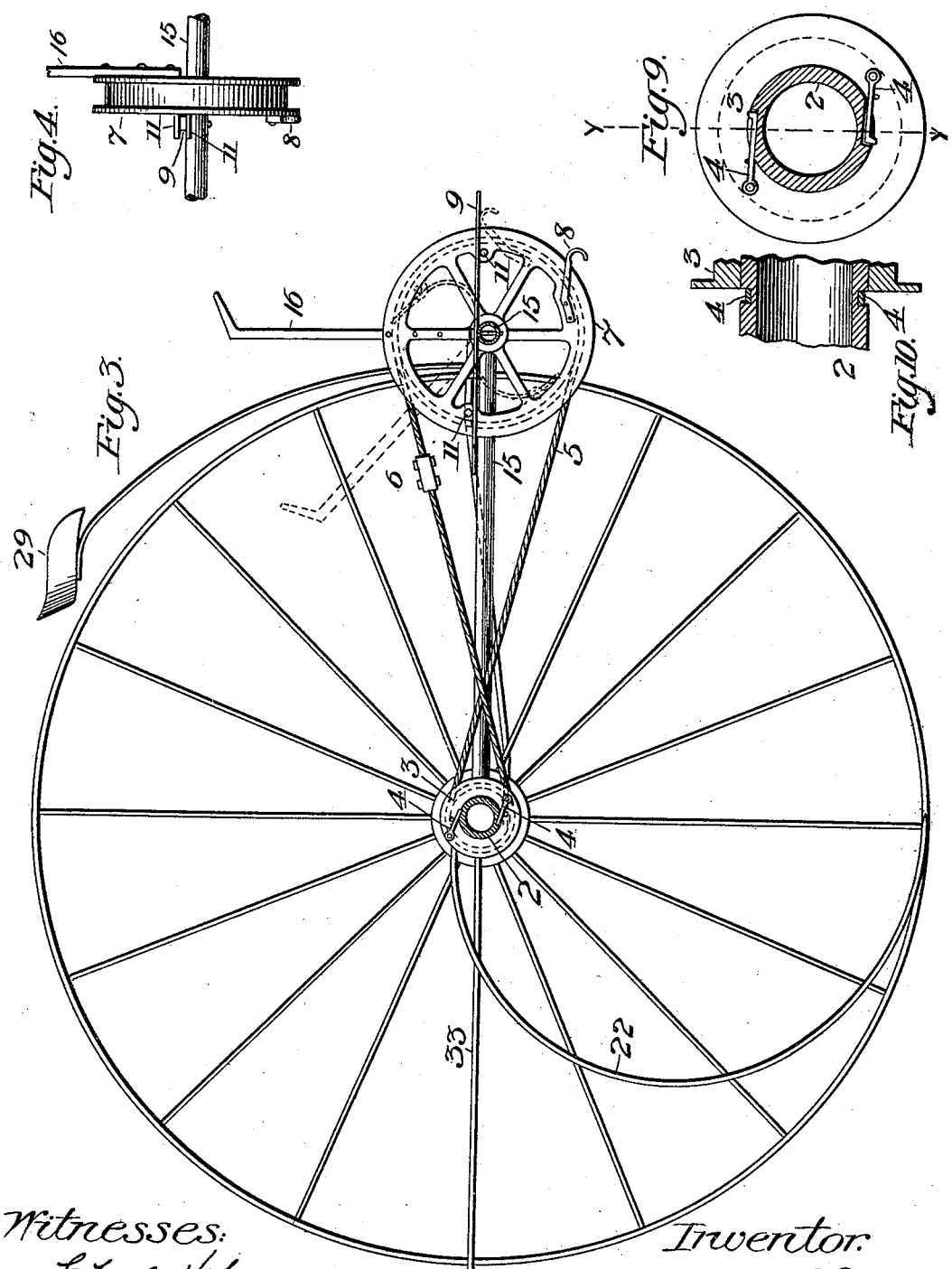
Witnesses:
Charles H. Lane
Thomas H. Ferguson.
Inventor:
Amos R. Black

UNITED STATES PATENT OFFICE.

AMOS R. BLACK, OF LAMAR, COLORADO.

REVOLVING SULKY HAY-RAKE.

SPECIFICATION forming part of Letters Patent No. 648,583, dated May 1, 1900.

Application filed January 19, 1900. Serial No. 1,966. (No model.)

*To all whom it may concern:*

Be it known that I, AMOS R. BLACK, a citizen of the United States, residing at Lamar, in the county of Prowers and State of Colorado, have invented certain new and useful Improvements in Revolving Sulky Hay-Rakes; and I do hereby declare the following to be a full, clear, and exact description of the invention, such as will enable others skilled in the art to which it appertains to make and use the same.

The object of my improvements herein is to provide an efficient, durable, convenient, and automatic self-dumping revolving sulky hay-rake, constructed entirely of steel and iron, that will do speedy and clean work in raking heavy hay crops, green alfalfa, cane, and cornstalks—a sulky hay-rake that the driver can operate the dumping mechanism thereof with his feet, leaving his hands free at all times to guide the horse.

The invention consists of the arrangements, features, and combinations hereinafter described and claimed.

The accompanying drawings are referred to as forming a part of this specification, in which—

Figure 1 is a perspective view of the invention. Fig. 2 is a plan view, seat removed. Fig. 3 is an enlarged section along line X X, Fig. 2, shafts omitted. Fig. 4 is an end view of draw-bar rope-sheave. Fig. 5 is a section through part of axle, showing manner of fastening spindles and rake-head lock-pin hole. Fig. 6 is a detail showing spring-bar rake-head lock and manner of fastening the same to frame and locking the rake-head. Fig. 7 is a detail showing manner of coupling the tubular frame to axle. Fig. 8 is a section through the axle, showing the manner of securing the enlarged rake-tooth seat to the axle and the spring rake-tooth to the enlarged seat. Fig. 9 is a section through the axle, showing ratchet rope-sheave and spring-dogs or pawls locking the rake-head. Fig. 10 is a section through Y Y, Fig. 9.

The revolving tubular axle 2 (see Fig. 5) is shrunken and riveted on the spindles 23. The running wheels are loosely mounted on the spindles 23. The ratchet rope-sheave 3 (see Figs. 1, 2, 3, and 9) is fitted loosely on the center of the tubular axle 2 and adapted to rotate backward thereon. The small ends of the pawls or spring-dogs 4 are secured loosely to the side of the ratchet rope-sheave 3, and the large ends of the spring-dogs 4 engage the offsets countersunk in the opposite sides of the tubular axle 2. The pawls or spring-dogs 4 rotate the axle 2 forward when dumping the rake; but they ratchet backward on the axle 2 when the mechanism of the rake is reset.

The enlarged rake-tooth seat 19 (see Figs. 1, 2, and 8) are secured detachably to the revolving axle 2. The spring rake-teeth 22 are secured detachably to the enlarged rake-tooth seat 19, both being secured to place by the clamping-bolt 21. The spring rake-teeth 22 are adapted to bear on the ground and rotate with the axle 2 alternately. The shank of the rake-tooth 22 is curved upon the same circle as the enlarged rake-tooth seat 19. The clip 31 confines the rake-tooth shank at that point. The upper ends of the spring rake-teeth 22 are provided with an eye through which clamping-bolt 21 passes. The hay-fingers 33 are fastened to axle-rings 18 and clean the load from the spring rake-teeth 22 when the rake-head is rotated. The revolving axle 2 and the enlarged rake-teeth seats 19 form the rake-head.

A tubular or pipe frame 15, (see Figs. 1, 2, 3, 4, and 6,) provided with shafts, is connected to the tubular axle 2 by means of the axle-rings 18, (see Figs. 1, 2, and 7,) within which the axle 2 rotates when the rake is dumped. The sliding sleeves 26 are fitted loosely on the shafts, the shaft carrying straps of the harness, and the safety belly-band straps are secured to the sliding sleeves 26. The sleeves slide forward when the rake is dumped and slide backward when the dumping mechanism of the rake is reset.

The front end of the spring-bar rake-head lock 17 (see Figs. 2 and 6) is rigidly secured to pipe-frame 15, projecting backward therefrom to and under the axle 2. The rear end of the spring-bar rake-head lock 17 is provided with a vertical pin 28, adapted to enter lock-pin hole 27 in axle 2 (see Figs. 5 and 6) at each revolution and automatically lock the rake-head and also lock the spring rake-teeth to the ground when raking. The spring of the bar rake-head lock 17 adapts it to be lowered at will. Such movement unlocks the rake-head and allows the rake-head and the rake-teeth to be revolved and dump the load from the rake-teeth.

The draw-bar rope-sheave 7 (see Figs. 1, 2, 3, and 4) is fitted loosely upon the front center of the pipe-frame 15 and adapted to rotate backward to dump the load from the rake-teeth, and then instantly rotate forward and reset the dumping mechanism to its original position. A small rope (preferably a wire rope) passes one and one-half times around rope-sheave 7, and thence back to and two and two-thirds times around the ratchet rope-sheave 3, forming the pull-rope 5, the ends thereof being clamped by rope-clamp 6, tightening the rope on the sheaves. The function of the pull-rope 5 is to revolve the rake-head forward and dump the load and rotate the ratchet rope-sheave 3 backward and reset the pawls or spring-dogs 4 after dumping.

The center of the leaf-spring 9 is rigidly secured to the pipe-frame 15. (See Figs. 1, 2, and 3.) The front end of the leaf-spring 9 is above and the rear end below the leaf-spring pins 11 in draw-bar rope-sheave 7. When the rake is dumped, the leaf-spring pins 11 put strong tension on the leaf-spring 9. (See dotted lines, Fig. 3.) The rebound from the tension on the leaf-spring 9 automatically resets the dumping mechanism of the rake.

The foot-lever 16 and the draw-bar and hook 8 (see Figs. 1 and 3) are rigidly secured to the draw-bar rope-sheave 7. Their functions are hereinafter described. The seat 29 is rigidly secured to the pipe-frame 15 to the left of the front center of the frame.

When the rake-teeth have gathered a load, the driver, occupying the seat 29, taps downward with his left foot upon spring-bar rake-head lock 17, thereby disengaging lock-pin 28 from the axle 2, when the draft from the horse quickly pulls draw-bar hook 8 forward and upward to the dead-center, when the pull thereby applied to pull-rope 5 rapidly revolves the rake-head and the rake-teeth two-thirds way around and dumps the load from the rake-teeth. The rapid rotating motion that the rake-head and the rake-teeth has thus attained completes the revolution of the rake-head and the lock-pin 28 automatically relocks the rake-head, thereby locking the rake-teeth to the ground to gather the next load. When the rake-teeth 22 are completing the latter two-thirds of their revolution, the rake is empty, and a few pounds pull will then move the running wheels quickly forward clear of the windrow, which movement is attained from the rebound from the tension on leaf-spring 9 and the draft of the horse. The rebound from leaf-spring 9 also instantly rotates the draw-bar rope-sheave 7 forward, the ratchet rope-sheave 3 backward, automatically restoring the rope-sheaves 3 and 7, the spring-dogs 4, the foot-lever 16, the draw-bar hook 8, and the sliding sleeves 26 to their original positions simultaneously.

In case of unforeseen accidents breaking the leaf-spring 9 the driver presses forward on the foot-lever 16 with his right foot, manually resetting the dumping mechanism of the rake to its original position.

When hauling the rake from field to field, on the road, or across irrigation-ditches, the rake is locked by an idle hook, holding the rake-teeth up under the seat 29.

The rake can be operated with equal efficiency by attaching a guide tongue or pole with braces to the pipe-frame 15 and a doubletree to the draw-bar hook 8.

I desire it to be understood that I do not propose in all cases to restrict my invention by attachment of a foot-lever to the draw-bar rope-sheave, since advantageous results may be attained by having foot-pins on the side of the draw-bar rope-sheave and dispense with foot-lever 16. Neither do I propose in all cases to restrict my invention to the use of a pull-rope and a rope-sheave, since advantageous results may be attained by using a sprocket chain or belt.

Having thus described my invention, what I claim as new, and desire to secure by Letters Patent, is—

1. In a sulky hay-rake, the combination with a revoluble axle, and rake-teeth secured thereto, of a wheel loosely mounted on said axle for backward rotation and provided with spring-dogs adapted to positively engage and turn the axle when said wheel is turned forwardly, and means for turning said wheel in both directions.

2. In a sulky hay-rake, the combination with a revolving rake, of an independent rotatably or rockably mounted member operatively connected with the rake, releasable locking mechanism for the rake, and a connection between the member and the draft apparatus, whereby the rake is turned or revolved by the draft when said locking mechanism is released.

3. In a sulky hay-rake, the combination with a revolving rake, of a wheel operatively connected with the rake, draft apparatus, a connection between the draft apparatus and the wheel, and locking mechanism for normally maintaining the point of attachment of said connection to the wheel at a point offset from that which it would normally assume, that is to say, the dead-center of the wheel, whereby when the locking mechanism is released the draft will turn the wheel and revolve the rake.

4. In a sulky hay-rake, the combination with a revolving rake, of an independent rotatably or rockably mounted member, an operative connection between the member and the rake, releasable locking mechanism, draft apparatus, a connection between the draft apparatus and the member, whereby the rake is turned or revolved when released, and a spring coacting with the member to cushion or elastically receive the shock of its sudden movement when released, which is also adapted to automatically return the member to normal position after the load has been dumped.

5. In a sulky hay-rake, the combination with a revolving axle, and rake-teeth secured thereto, of a ratchet rope-sheave loosely mounted for backward rotation on said axle and provided with spring-dogs adapted to positively engage with the axle on the forward rotation of said sheave, a draw-bar rope-sheave, a rope connecting the said sheaves together, draft apparatus, a connection between the draft apparatus and the draw-bar rope-sheave, locking mechanism for normally maintaining the point of attachment of said connection at a point offset from that which it would normally assume, that is to say, the dead-center of the sheave, whereby when the locking mechanism is released the draft will turn the sheave and revolve the rake, and a leaf-spring having its center portion secured and its ends free and positioned for engagement by the draw-bar rope-sheave, said spring being adapted to cushion or elastically receive the shock of the sudden movement of said draw-bar rope-sheave and serving to return the same to normal position after the load has been dumped and also to turn the ratchet rope-sheave back idly on the axle to cause the dogs to assume their normal position.

6. In a sulky hay-rake, the combination with a revolving rake, of an independent rotatably or rockably mounted member, an operative connection between the member and the rake, releasable locking mechanism, draft apparatus, a connection between the draft apparatus and the member whereby the rake is turned or revolved when released, a spring coacting with the member to cushion or elastically receive the shock of its sudden movement when released, which is also adapted to automatically return the member to normal position after the load has been dumped, and a lever secured to said member and in convenient position for manipulating by the driver, whereby the rake can be reset manually.

7. In a sulky hay-rake, the combination with a revolving rake, of an independent rotatably or rockably mounted member, an operative connection between the member and the rake, releasable locking mechanism, draft apparatus, a connection between the draft apparatus and the member whereby the rake is turned or revolved when released, and a lever secured to said member and in convenient position for manipulating by the driver, whereby the rake can be reset manually.

AMOS R. BLACK.

Witnesses:
G. J. ROLLANDET,
CHARLES S. BOOTH.